United States Patent [19]
Peng et al.

[11] Patent Number: 5,644,483
[45] Date of Patent: Jul. 1, 1997

[54] VOLTAGE BALANCED MULTILEVEL VOLTAGE SOURCE CONVERTER SYSTEM

[75] Inventors: Fang Zheng Peng, Oak Ridge; Jih-Sheng Lai, Knoxville, both of Tenn.

[73] Assignee: Lockheed Martin Energy Systems, Inc., Oak Ridge, Tenn.

[21] Appl. No.: 446,366

[22] Filed: May 22, 1995

[51] Int. Cl.$^6$ .................................................. H02M 5/45
[52] U.S. Cl. ............................................ 363/37; 363/132
[58] Field of Search ................................ 363/35, 36, 37, 363/132

[56] References Cited

U.S. PATENT DOCUMENTS

| | | | |
|---|---|---|---|
| 4,651,266 | 3/1987 | Fujioka et al. | 363/39 |
| 5,038,267 | 8/1991 | DeDoncker et al. | 363/89 |
| 5,172,309 | 12/1992 | DeDoncker et al. | 363/132 |

OTHER PUBLICATIONS

D.A. Woodford, et. al., "Controlling a Back-to-Back DC Link to Operate as a Phase Shift Transformer", CIGRE 1994 Session Papers, Group 14, Paper 14-202, 1994 France.

*Primary Examiner*—Peter S. Wong
*Assistant Examiner*—Shawn Riley
*Attorney, Agent, or Firm*—Vincent A. Branton; James M. Spicer

[57] ABSTRACT

A voltage balanced multilevel converter for high power AC applications such as adjustable speed motor drives and back-to-back DC intertie of adjacent power systems. This converter provides a multilevel rectifier, a multilevel inverter, and a DC link between the rectifier and the inverter allowing voltage balancing between each of the voltage levels within the multilevel converter.

The rectifier is equipped with at least one phase leg and a source input node for each of the phases. The rectifier is further equipped with a plurality of rectifier DC output nodes. The inverter is equipped with at least one phase leg and a load output node for each of the phases. The inverter is further equipped with a plurality of inverter DC input nodes. The DC link is equipped with a plurality of rectifier charging means and a plurality of inverter discharging means. The plurality of rectifier charging means are connected in series with one of the rectifier charging means disposed between and connected in an operable relationship with each adjacent pair of rectifier DC output nodes. The plurality of inverter discharging means are connected in series with one of the inverter discharging means disposed between and connected in an operable relationship with each adjacent pair of inverter DC input nodes. Each of said rectifier DC output nodes are individually electrically connected to the respective inverter DC input nodes. By this means, each of the rectifier DC output nodes and each of the inverter DC input nodes are voltage balanced by the respective charging and discharging of the rectifier charging means and the inverter discharging means.

10 Claims, 9 Drawing Sheets

VOLTAGE BALANCED MULTILEVEL VOLTAGE SOURCE CONVERTER SYSTEM

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates to high voltage power system electronics, and more particularly to an apparatus for interconnecting two or more dissimilar high voltage power systems for applications such as adjustable speed motor drives and DC intertie of adjacent power system grids.

BACKGROUND

A high voltage power conversion system typically consists of a controlled rectifier which connects to a utility power source and an inverter which connects to an output load. Traditional high voltage power conversions, including rectification and inversion, use phase-controlled current source converters which have several disadvantages such as requiring custom developed converter transformers, producing high levels of harmonics, drawing large reactive power and incurring high system cost. Implementation of an ordinary multilevel converter may eliminate the need for the transformer and thus reduce the system cost. However, the elimination of the transformer produces an undesirable voltage unbalance problem between the capacitors spanning the potential of the entire DC link. One proposed solution to this voltage unbalance problem is to replace the capacitors with batteries thereby making the potential at the respective converter levels a constant, however, this is not a practical solution due to limited battery life.

When connecting two adjacent AC power system grids, commonly referred to as back-to-back intertie, the frequency and phase angle difference between the systems can cause unnecessary circulating currents between the power systems resulting in significant power losses. The power loss commonly attributed to AC power system grid intertie can be as high as 10 percent to 20 percent of the overall available system power. When such losses are applied to a power system having an overall system power level of several hundred megawatts, a 10 percent to 20 percent power loss is unacceptable for practical and economic purposes. Due to the high losses associated with AC power system grid intertie, most back-to-back intertie systems use a DC link to avoid frequency and phase difference anomalies. Typical DC link back-to-back interties employ current source converters to convert power from AC to DC or vice versa. The 12-pulse type current source converters are quite common.

A typical 12-pulse converter for power system back-to-back intertie and high voltage DC power transmission consists primarily of two six-pulse converters having a 30 degree phase difference between device switchings. A phase shift transformer is required between the three-phase power system and the two converters to obtain the 30 degree phase shift. The obvious disadvantage of this circuit topology is the prominent harmonic content caused by square wave operation and reactive power components implemented for phase control. For a typical six-pulse converter, the AC current comprises approximately twenty percent of the fifth harmonic and fourteen percent of the seventh harmonic. For a typical 12-pulse converter, the AC current contains approximately nine percent of the eleventh harmonic and eight percent of the thirteenth harmonic. Consequently, the voltage at the DC side of the respective converters also contain significant even numbered order harmonics resulting in high power losses, acoustic noise, communication interference and heat stress of passive components and generators. A significant amount of filter circuitry is thusly necessary to attenuate the harmonics and the subsequent effects.

A modern converter station for power system intertie and high voltage DC transmission normally utilizes two sets of double-tuned AC filters and two sets of double-tuned DC filters to alleviate undesired harmonics. These converter stations normally require converter transformers between the AC line service and the 12-pulse converter. The converter transformers are specifically designed to have higher leakage inductance and to avoid saturation due to converter generated harmonics. Implementation of the converter transformer greatly increases the system cost as well as lessens system efficiency and reliability.

There are several solutions for the elimination of the converter transformer and harmonic filters for power system DC intertie. A multilevel voltage source converter is a conceivable option. A multilevel voltage source converter synthesizes the voltage waveform using DC link capacitors instead of the aforementioned AC transformers. Typically, a multilevel converter consists of several levels of capacitors on a DC bus. However, the capacitor voltage in a multilevel converter can not be balanced unless the capacitors are replaced by a constant DC voltage source. Due to size and cost constraints batteries are not a practical alternative.

OBJECTS OF THE INVENTION

Accordingly, it is an object of the present invention to provide a new and improved multilevel converter for connecting adjacent AC power system grids.

It is another object of the present invention to provide a multilevel converter having a DC link which allows cost effective, instantaneous voltage balancing between the voltage levels internal to the multilevel converter.

It is another object to apply the present invention to high voltage power applications such as back-to-back intertie of AC systems having different frequencies.

It is another object to apply the present invention to high voltage power applications such as back-to-back intertie of AC systems having different phase angles.

It is another object to apply the present invention to high voltage power applications wherein different high power systems have a dissimilar number of phases.

It is another object to apply the present invention to high voltage power applications wherein different high power systems having dissimilar system dynamics.

It is another object to apply the present invention to high voltage power applications for reactive power compensation.

It is another object to apply the present invention to high voltage power applications such as adjustable speed motor drives.

Further and other objects of the present invention will become apparent from the description contained herein.

SUMMARY OF THE INVENTION

A voltage balanced multilevel converter for high power AC applications such as adjustable speed motor drives and back-to-back DC intertie for adjacent power systems is provided. In accordance with one aspect of the present invention, a new and improved multilevel converter system includes a rectifier, an inverter and a DC link. The rectifier is equipped with at least one phase leg and a source input node for each of the phases. The rectifier is further equipped with a plurality of rectifier DC output nodes. The inverter is equipped with at least one phase leg and a load output node for each of the phases. The inverter is further equipped with a plurality of inverter DC input nodes. The DC link is equipped with a plurality of rectifier charging means and a plurality of inverter discharging means. The plurality of rectifier charging means are connected in series with one of the rectifier charging means disposed between and connected in an operable relationship with each adjacent pair of the rectifier DC output nodes. The plurality of inverter discharging means are connected in series with one of the inverter discharging means disposed between and connected in an operable relationship with each adjacent pair of the inverter DC input nodes. Each of said rectifier DC output nodes are individually electrically connected to the respective inverter DC input nodes. By the above means each of the rectifier output nodes and each of the inverter DC input nodes are voltage balanced by to the respective charging and discharging of the rectifier charging means and the inverter discharging means.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
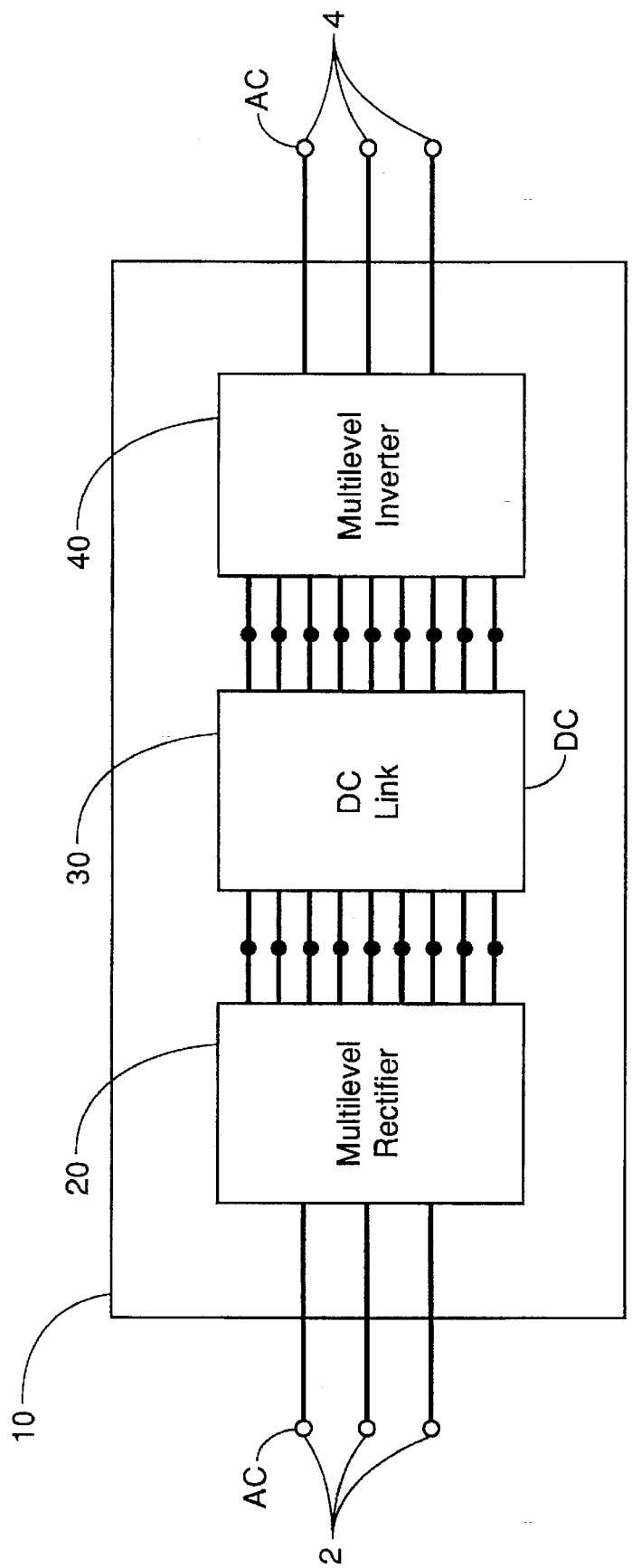
FIG. 1 is a functional block diagram of the claimed invention representing the primary subsystems of the circuit.

Referring now in detail to the drawings wherein like parts are designated by like reference numerals throughout, there is illustrated in FIG. 1 a functional block diagram showing the preferred embodiment of the apparatus of the present invention. The preferred embodiment of the invention utilizes a rectifier 20, an inverter 40 and a DC link 30 to accomplish the objects of the instant invention.

Figure 2:
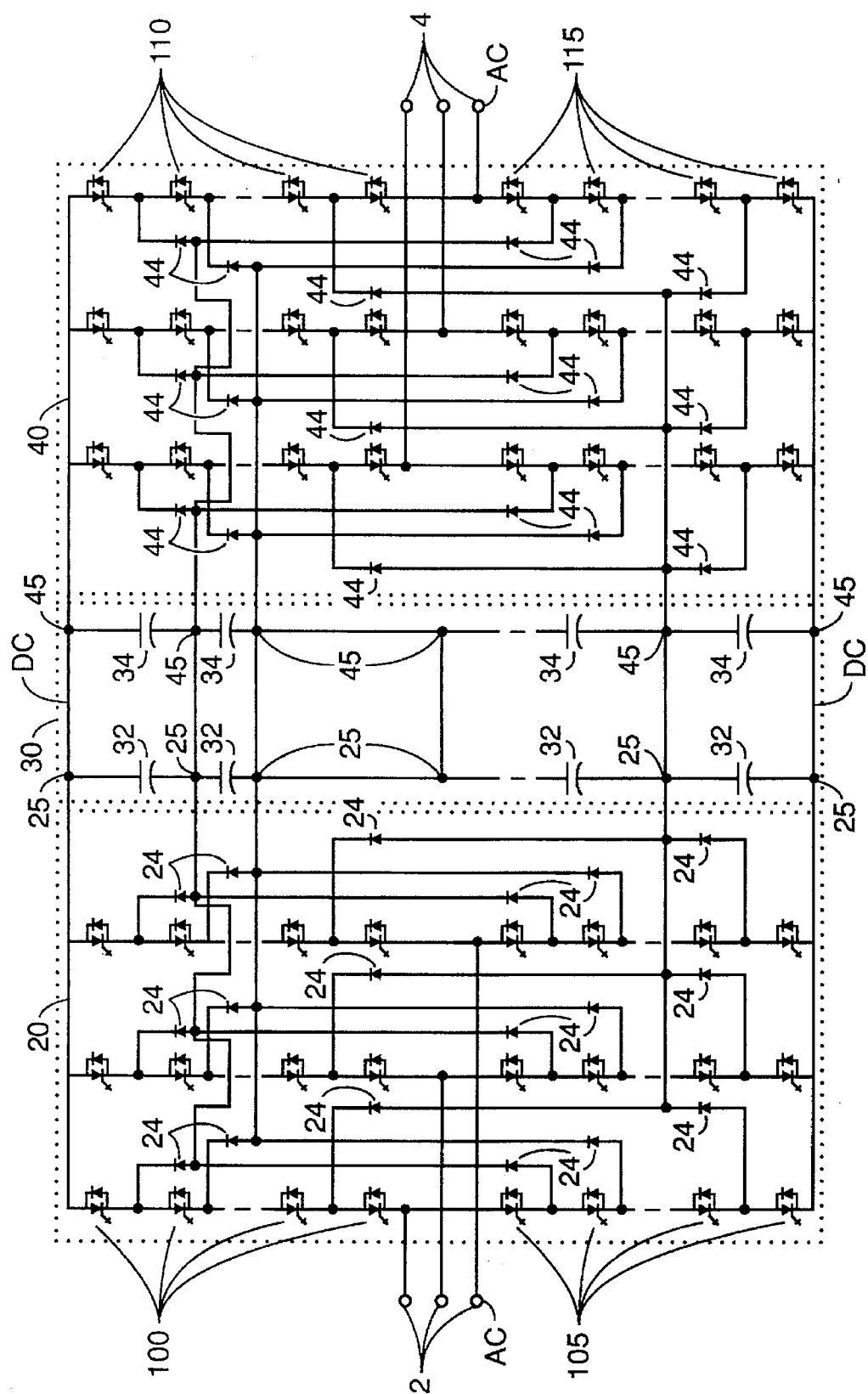
FIG. 2 is a schematic diagram of a three phase, m-level, multilevel converter implementing the DC link.

In order to balance voltage distribution among each voltage level in a multilevel converter, a multilevel converter having a DC link means is described herein. FIG. 2 generally shows the multilevel converter 10 having the DC link 30 between each corresponding voltage level of the rectifier 20 and inverter 40, respectively. The multilevel converter 10 can have an unlimited number of levels. The number of capacitors required for either the rectifier 20 or the inverter 40 is determined by:

$$m_c = m-1 \qquad \text{Eq. 1}$$

where $m_c$ is the number of capacitors used with the rectifier and inverter, respectively, and m is the number of converter voltage levels. The number of switching devices needed for each phase leg is determined by:

$$m_s = 2(m-1) \qquad \text{Eq. 2}$$

where $m_s$ is the number of switching devices needed for each phase leg of the rectifier and inverter, respectively, and m is the number of converter voltage levels.

The connections between the DC link capacitors 32 and 34 and corresponding upper m−1 switches 100 and 110 and lower m−1 switches 105 and 115 are blocked by diodes 24 and 44. It should be noted that the voltage rating of each diode must be commensurate with the voltage present at the respective voltage levels of the converter. These voltage levels will not be uniform throughout the converter.

Reference is further given to FIG. 2 wherein each half of each phase of the rectifier 20 and inverter 40 of the multilevel converter 10 respectively consists of m−1 switches, where m is the number of converter voltage levels. The capacitor voltage present at the rectifier output nodes 25 and the inverter input nodes 45 will be highly unbalanced if said nodes are not connected with respect to similar voltage levels between the rectifier 20 and the inverter 40. By connecting the nodes having similar voltage levels between the rectifier 20 and inverter 40, the respective DC link capacitors 32 and 34 tend to compensate for one another thereby providing voltage balancing at the DC link 30 in the multilevel converter 10.

Figure 4:
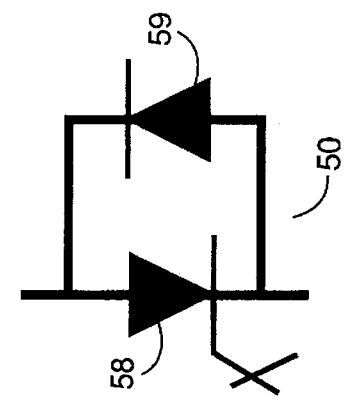
FIG. 4 is a schematic diagram showing the circuit elements associated with each of the respective rectifier and inverter switching components.
Figure 3:
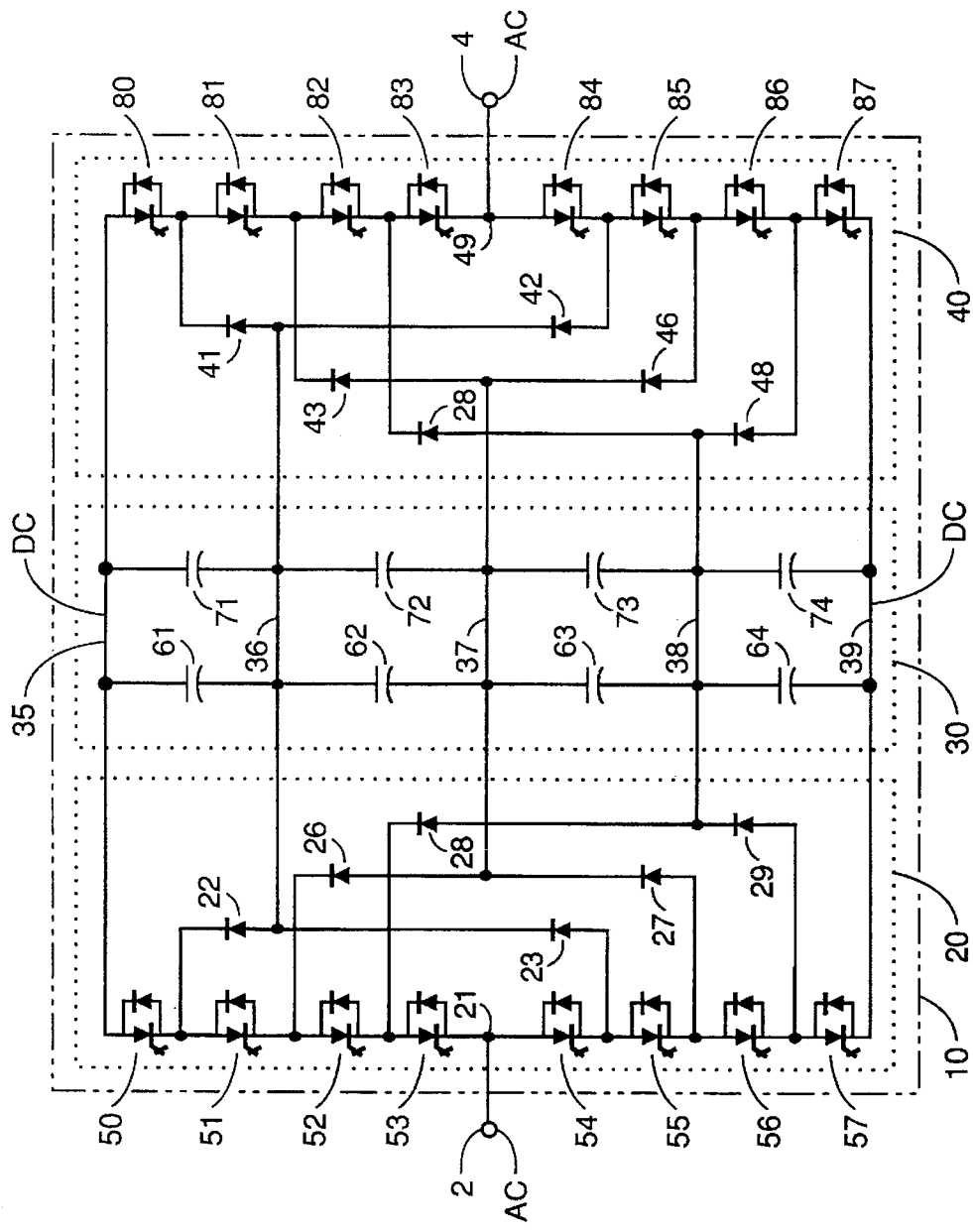
FIG. 3 is a schematic diagram of a single phase leg of a five level converter having the DC link of the claimed invention.

Implementation and operational aspects of the multilevel converter are most clearly described using the example of a five level, single phase multilevel converter as shown in FIG. 3. Eight switches per phase are used for the rectifier 20 and the inverter 40 in a five-level converter system 10 utilizing this technique. The rectifier 20, as shown in FIG. 3 has eight switches 50, 51, 52, 53, 54, 55, 56 and 57. Each switch comprises a gate controlled device 58 and an anti-parallel diode 59 as shown in FIG. 4. The gate controlled device 58 and the anti-parallel diode 59 may be either a single module or a set of modules connected in series. The gate turn-off devices may be any of the components capable of switching such as a gate turn-off thyristor, an insulated gate bipolar transistor, a power MOSFET, a MOSFET controlled thyristor, a bipolar junction transistor, a static induction transistor, a static induction thyristor or a MOSFET controlled thyristor. The AC phase input node 2 connects to the middle node 21 of the rectifier 20. Conversely, the AC phase node 4 connects to the middle node 49 of the inverter 40. Due to the symmetrical connection and configuration of the converter 10, the roles of the rectifier 20 and inverter 40 can be swapped when the direction of power flow is reversed.

Using the example of FIG. 3, the DC link 30 comprises four capacitors connected in series. The rectifier capacitors are represented by 61, 62, 63 and 64 while the inverter capacitors are represented by 71, 72, 73 and 74. The connections between the capacitors and the corresponding switches are blocked by diodes 22, 23, 26, 27, 28 and 29 on the rectifier side and by diodes 41, 42, 43, 46, 47 and 48 on the inverter side. For example, diode 22 is required to prevent capacitor 61 through switch 50. Diode 23 is required to prevent capacitors 62, 63 and 64 through switches 55, 56 and 57. A similar configuration of blocking diodes is required on the inverter side of the multilevel converter.

Without the connections between the two sides of capacitors, the rectifier side and the inverter side respectively, the electric potential to the various voltage levels of the converter would be unbalanced. For the rectifier side, the inner two switches, 51 and 56, are conductive for a longer period than the outer two switches, 50 and 57, and the inner two capacitors, 62 and 63, are charged more than the outer two capacitors, 61 and 64. For the inverter side, the inner two switches, 81 and 86, are conductive for a longer period than the outer two switches, 80 and 87, and the inner two capacitors, 72 and 73, are discharged more than the outer two capacitors, 71 and 74.

With the connections 35, 36, 37, 38 and 39 between the two sides of capacitors 61–71, 62–72, 63–74, respectively the charge in the rectifier 20 and the discharge in the inverter 40 tend to balance. In other words, the various voltage levels within the multilevel converter remain constant during system operation due to the respective charging and discharging of the capacitors on the rectifier and inverter sides of the DC link.

Figure 5:
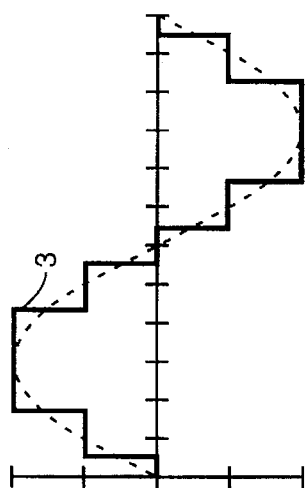
FIG. 5 is a graph showing the phase voltage waveform for the inverter side of the single phase leg of the five level converter shown in FIG. 3.

With reference to FIG. 5, the converter AC phase output wave 3 at the inverter output node 4 of the circuit shown in FIG. 3, is shown having five voltage levels: $-0.25\ V_s$, $-0.5\ V_s$, $0.25\ V_s$ and $0.5\ V_s$, where $V_s$ is the DC link voltage. Switches 81, 82, 83 and 84 must be conducting to obtain $0.25\ V_s$ at node 4. The following table details the relationships between the different levels of output phase voltages with respect to switch states.

TABLE 1

Conductive States for Inverter Switches 80, 81, 82, 83, 84, 85, 86 and 87 for voltage waveform shown in FIG. 5

| OUTPUT | SWITCH STATE | | | | | | | |
|---|---|---|---|---|---|---|---|---|
| | 80 | 81 | 82 | 83 | 84 | 85 | 86 | 87 |
| $0.5 V_s$ | 1 | 1 | 1 | 1 | 0 | 0 | 0 | 0 |
| $0.25 V_s$ | 0 | 1 | 1 | 1 | 1 | 0 | 0 | 0 |
| 0 | 0 | 0 | 1 | 1 | 1 | 1 | 0 | 0 |
| $-0.25 V_s$ | 0 | 0 | 0 | 1 | 1 | 1 | 1 | 0 |
| $-0.5 V_s$ | 0 | 0 | 0 | 0 | 1 | 1 | 1 | 1 |

It can be seen that the middle two switches, 81 and 86 which are required for the $0.25\ V_s$ and $0.5\ V_s$ levels, must be conducting for a longer period than the outer two switches, 80 and 87 which are only required for the $0.5\ V_s$ level. For the inverter side, the middle two capacitors, 72 and 73, will be discharged more than the outer capacitors, 71 and 74. For the rectifier side, due to reverse power flow with respect to the inverter side, the middle two capacitors, 62 and 63, will be charged more than the outer two capacitors, 61 and 64. Thus, the voltage unbalance occurs at the DC link 30 between the rectifier 20 and the inverter 40 but in opposite directions. By interconnecting the capacitors at similar voltage levels between the rectifier and the inverter, the capacitor charge and discharge will be balanced.

Figure 6:
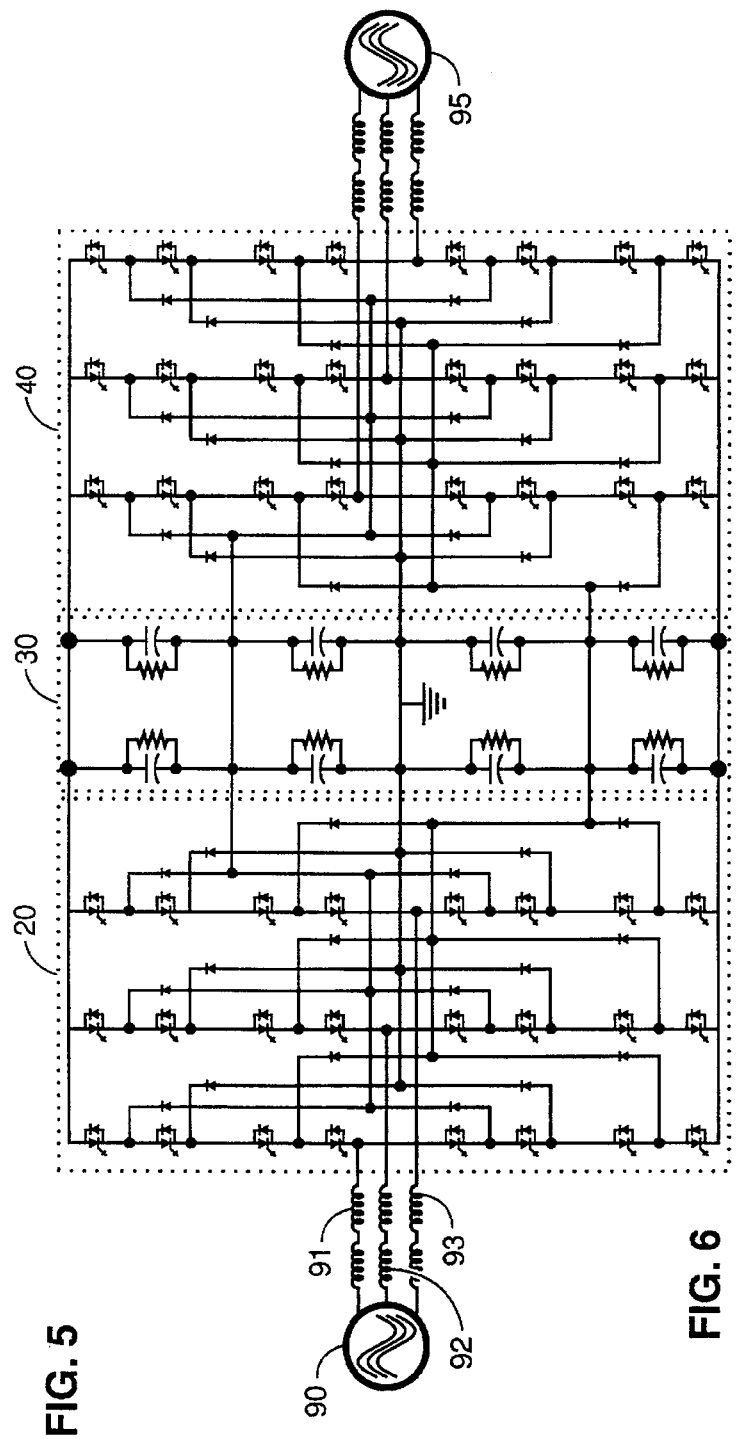
FIG. 6 is a schematic diagram illustrating a typical three phase back-to-back intertie of two high power AC system grids using the claimed invention.
Figure 7:
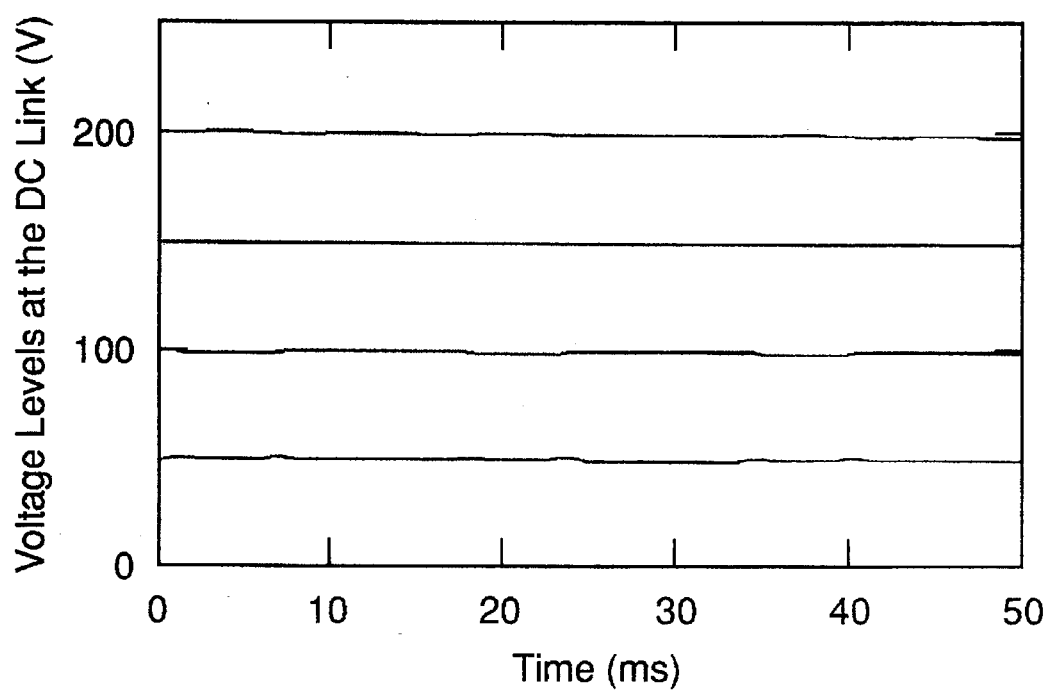
FIG. 7 is a graph showing the simulated results of capacitor voltage values for all four voltage levels of the multilevel converter shown in FIG. 6.

With reference to FIG. 6, the three phase source 90 having sinusoidal phase voltages of $V_{sa}$, $V_{sb}$, and $V_{sc}$ is tied to the load 95 having phase voltages of $V_{la}$, $V_{lb}$ and $V_{lc}$. As previously taught, the AC intertie can produce large circulating currents and losses due to unsynchronization. The multilevel converter connects a multilevel rectifier 20 to the source 90 and a multilevel inverter to the load 95 with the DC link 30 as previously described. System simulation results as shown in FIG. 7 show that all four DC Link capacitor voltages are identical at the steady state.

Figure 8:
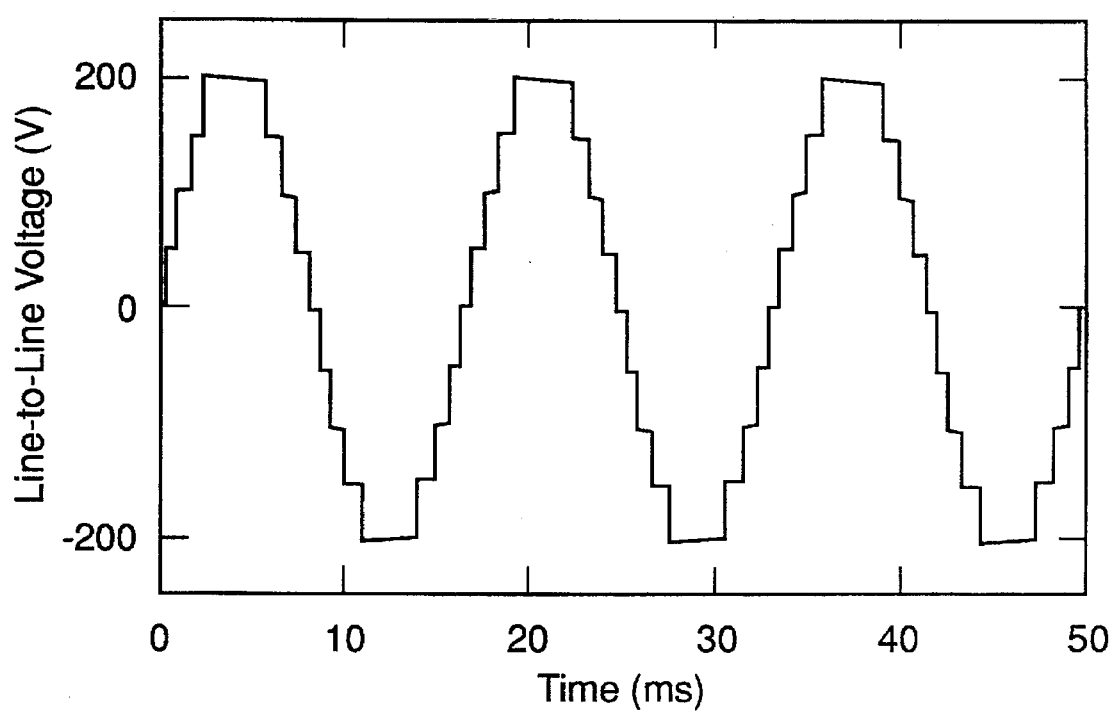
FIG. 8 is a graph showing the synthesized one cycle steady-state multilevel output line-to-line voltage for the multilevel converter shown in FIG. 6.
Figure 9:
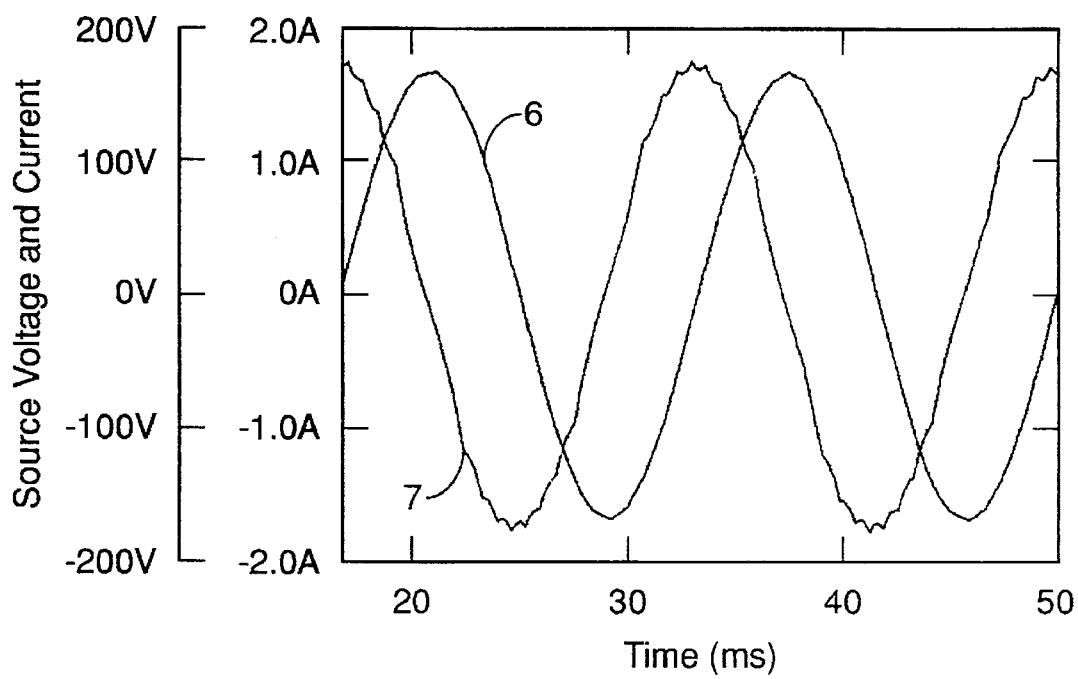
FIG. 9 is a graph showing the simulation results of the steady-state line current and the respective source phase voltage under non-unity power factor operation for the multilevel converter shown in FIG. 6.
Figure 10:
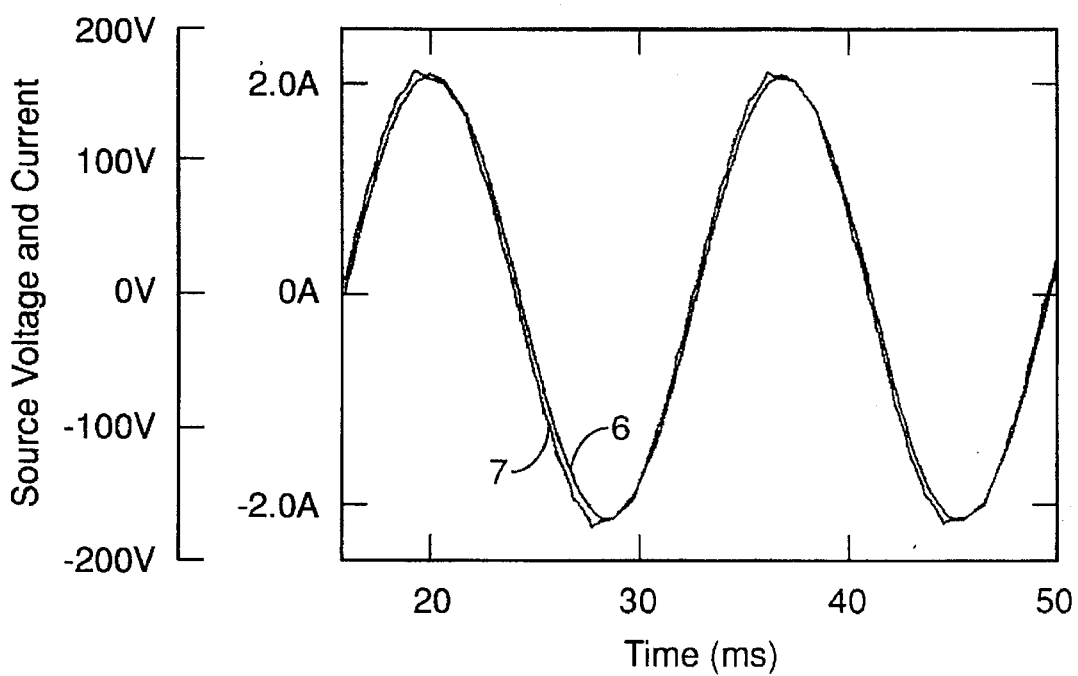
FIG. 10 is a graph showing the simulation results of the steady-state line current and the respective source phase voltage under unity power factor operation for the multilevel converter shown in FIG. 6.

On the rectifier side, three smoothing inductors 91, 92 and 93, are connected between the source voltages, $V_{sa}$, $V_{sb}$, and $V_{sc}$, and the rectifier input terminal voltages, $V_{ca}$, $V_{cb}$ and $V_{cc}$. Similar connections are also applied to the inverter side with smoothing inductors connected between inverter output voltages, $V_{ia}$, $V_{ib}$, and $V_{ic}$, and the load voltages, $V_{la}$, $V_{lb}$ and $V_{lc}$. The voltage waveform shown in FIG. 8 shows the synthesized one cycle steady-state multilevel line-to-line voltage applicable to the rectifier input terminal and inverter output terminal. The converter can be operated at any power factor. FIG. 9 clearly shows that under non-unity power factor operation, steady-state line current 7 leads the phase voltage 6. As shown in FIG. 10, with unity power factor operation, the line current 7 more closely tracks the corresponding phase voltage 6 with less distortion in the line current waveform. This plot demonstrates that the line current 7 and phase voltage 6 are in phase with respect to each other thereby eliminating the need for reactive power compensation. Drawing reactive power is the one of the most significant disadvantages of conventional DC intertie systems. It will be obvious to those of ordinary skill in the relevant art that FIG. 10 also demonstrates that power factor and harmonic distortion can be controlled through proper control system design. By increasing the number of voltage levels, the current harmonics and the size of the harmonic filters can be further reduced.

EXAMPLE

Figure 11A:
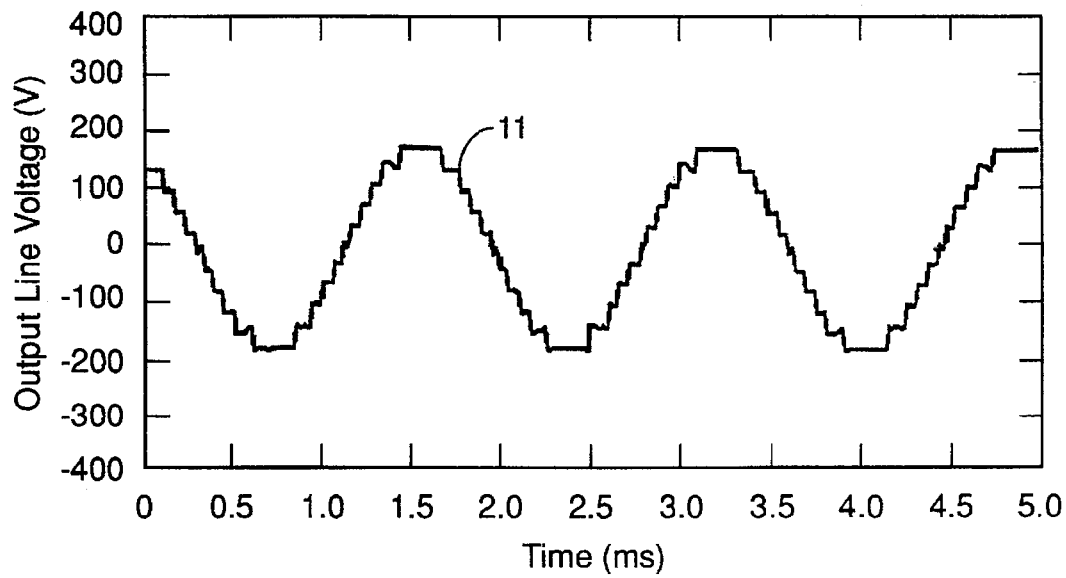
FIG. 11a is a voltage response graph showing the experimental results of the output line voltage produced by a 6-level inverter.
Figure 11B:
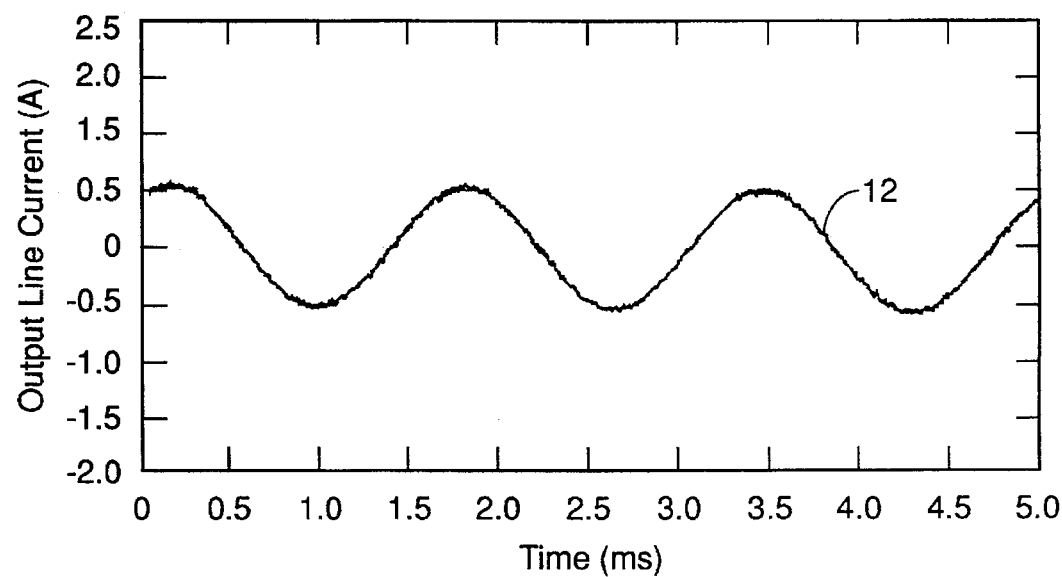
FIG. 11b is a current response graph showing the experimental results of the output line current produced by a 6-level inverter.
Figure 12A:
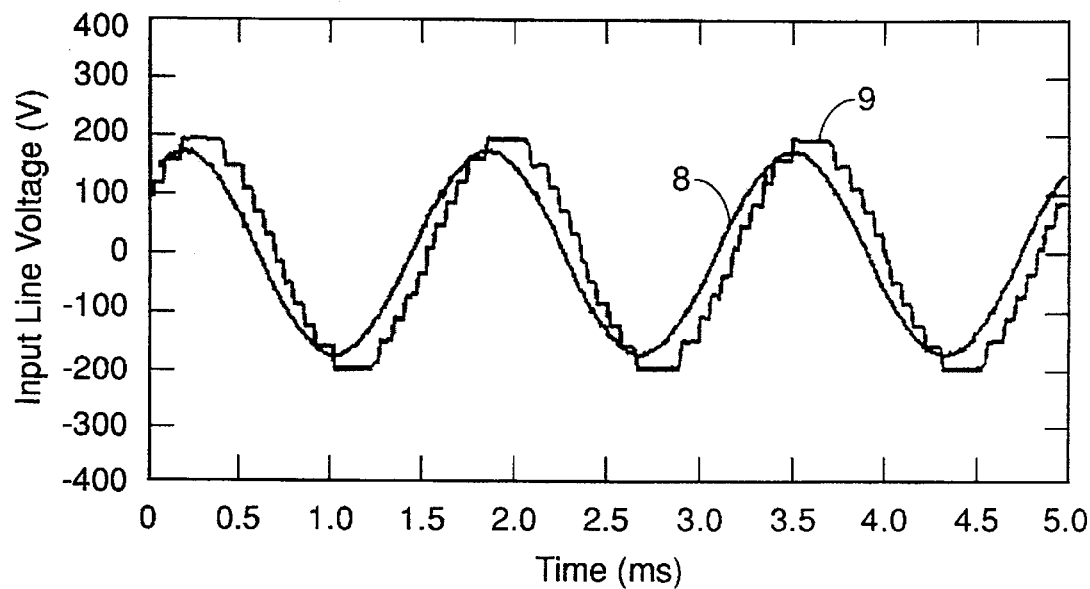
FIG. 12a is a line voltage graph showing the 6-level converter experimental input voltage waveforms used to obtain the output line voltage and current waveforms shown in FIGS. 11a and 11b.
Figure 12B:
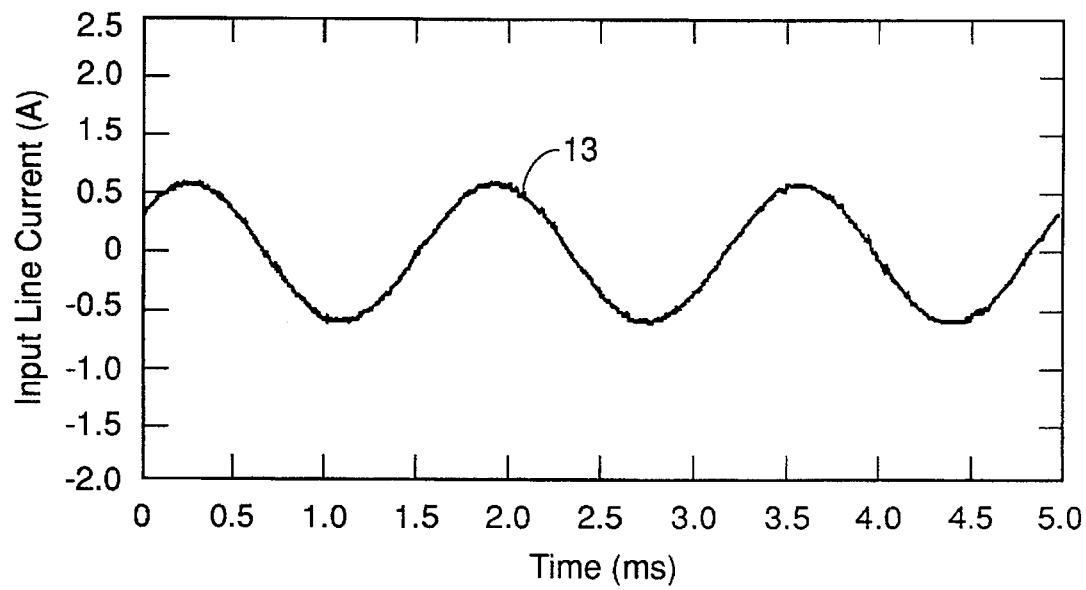
FIG. 12b is a line current graph showing the 6-level converter experimental input current waveform used to obtain the output line voltage and current waveforms shown in FIGS. 11 a and 11b.

A six-level multilevel converter using the DC link was constructed and tested. Experimental results, as shown in FIG. 11a and FIG. 11b, clearly demonstrate the accurate output line current 12 and output line voltage 11 approximations of the input power waveform. FIG. 12a shows the source line-to-line voltage 8 and the converter line-to-line voltage 9 of the aforementioned six-level multilevel converter. FIG. 12b shows the corresponding input current waveform 13.

As previously stated, increasing the number of voltage levels within the multilevel converter increases the accuracy of the respective output waveform approximations.

Figure 13:
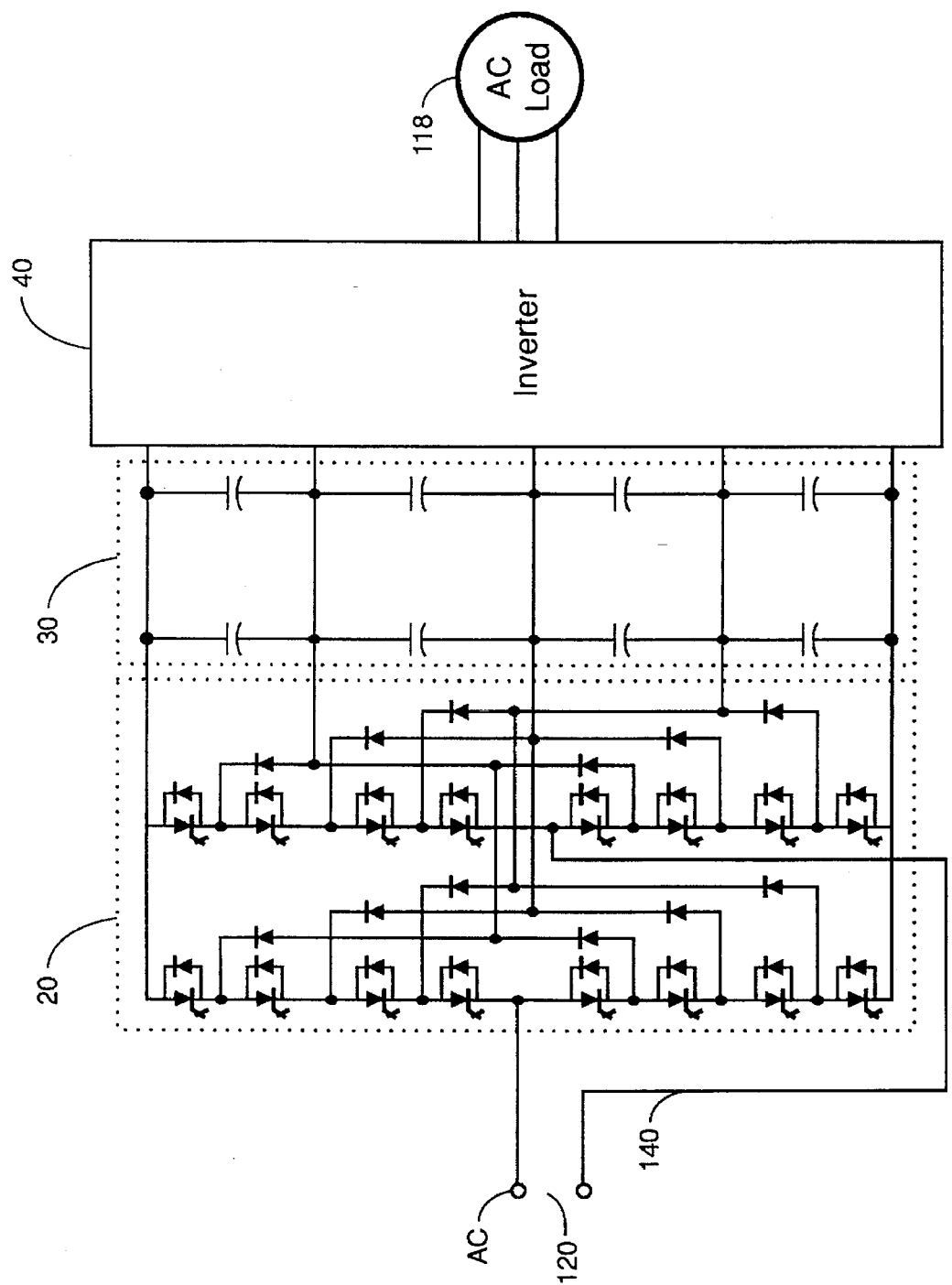
FIG. 13 is shows a full bridge embodiment of the present invention enabling back-to-back intertie of a single-phase source and a three-phase load.

As shown in FIG. 13, the multilevel converter may be applied to high voltage AC power systems having different phase quantities. For example, the source may be a single-phase power system 120 while the load is a three-phase power system 118. The DC link 30 and inverter 40 are configured in the manner previously described herein. It will be obvious to one of ordinary skill in the art that similar configurations of the multilevel converter will allow a variety of dissimilar phase numbered system interties.

This multilevel converter system may be applied to a variety of high voltage AC power applications. One such application is for the back-to-back intertie of high voltage AC power systems having dissimilar phase frequencies or other system dynamics. The multilevel converter may also be used for phase shift intertie between two high voltage AC power systems having dissimilar power phase angles. Yet another application would be to provide reactive power compensation between two high voltage AC power systems. This multilevel converter may also be applied to adjustable speed motor drive systems. Conventional motor drives normally use either current source inverters or voltage source inverters having square wave or pulse-width modulation. Problems typically encountered with conventional motor drives utilizing these rectifier/inverter methods include non-unity power factor at the rectifier input and non-sinusoidal voltage or current at the inverter output. Applying the multilevel converter described herein, utilizing the adjustable speed drive motor as either the source or the load, near sinusoidal voltage and current at the rectifier input and the inverter output may be obtained. Unity power factor may also be obtained.

While there has been shown and described what is at present considered the preferred embodiments of the invention, it will be obvious to those skilled in the art that various changes and modifications can be made therein without departing from the scope of the invention defined by the appended claims.

What is claimed is:

1. A multilevel converter system, comprising:

a rectifier having at least one phase leg and a source input node for each of said phases, said rectifier further having a plurality of rectifier DC output nodes;

an inverter having at least one phase leg and a load output node for each of said phases, said inverter further having a plurality of inverter DC input nodes; and a DC link having a plurality of rectifier charging means and a plurality of inverter discharging means, said plurality of rectifier charging means connected in series, one of said rectifier charging means disposed between and connected in an operable relationship with each adjacent pair of said rectifier DC output nodes, said plurality of inverter discharging means connected in series, one of said inverter discharging means disposed between and connected in an operable relationship with each adjacent pair of said inverter DC input nodes, each of said rectifier DC output nodes individually electrically connected to said respective inverter DC input nodes;

whereby each of said rectifier DC output nodes and each of said inverter input nodes are voltage balanced by to the respective charging and discharging of said rectifier charging means and said inverter discharging means.

2. A multilevel converter system as described in claim 1 wherein:

said rectifier further comprises at least one rectifier switching means, one of said rectifier switching means disposed between and connected in an operable relationship with each of said rectifier DC output nodes and said source input node; and said inverter further comprises at least one inverter switching means, one of said inverter switching means disposed between and connected in an operable relationship with each of said inverter DC input nodes and said load output node.

3. A multilevel converter system as described in claim 2 wherein:

said rectifier has at least one rectifier blocking diode disposed between and connected in an operable relationship with each of said rectifier DC output nodes and each of said corresponding rectifier switching means; and said inverter has at least one inverter blocking diode disposed between and connected in an operable relationship with each of said inverter DC input nodes and each of said corresponding inverter switching means.

4. A multilevel converter system as described in claim 2 wherein each of said rectifier switching means and said inverter switching means comprise a gate controlled device and an anti-parallel device connected in parallel and oppositely biased with respect to one another.

5. A multilevel converter system as described in claim 4 wherein said gate controlled device is a component selected from the group consisting of a gate turn-off thyristor, an insulated gate bipolar transistor, a power MOSFET, a MOSFET controlled thyristor, a bipolar junction transistor, a static induction transistor, a static induction thyristor and a MOSFET turn-off thyristor.

6. A multilevel converter system as described in claim 5 wherein said anti-parallel device is a diode.

7. A multilevel converter system as described in claim 1 wherein said rectifier incorporates a single phase and said inverter incorporates a single phase.

8. A multilevel converter system as described in claim 1 wherein said rectifier incorporates a single phase and said inverter incorporates a plurality of phases.

9. A multilevel converter system as described in claim 1 wherein said rectifier incorporates a plurality of phases and said inverter incorporates a single phase.

10. A multilevel converter system as described in claim 1 wherein said rectifier incorporates a plurality of phases and said inverter incorporates a plurality of phases.

* * * * *